US007905964B2

(12) United States Patent
Witteler et al.

(10) Patent No.: US 7,905,964 B2
(45) Date of Patent: Mar. 15, 2011

(54) METHOD FOR THE PASSIVATION OF METAL SURFACES WITH COMPOSITIONS COMPRISING POLYMERS WITH ACID GROUPS AND WAXES

(75) Inventors: Helmut Witteler, Wachenheim (DE); Walter Bertkau, Ludwigshafen (DE); Thomas Heidenfelder, Dannstadt-Schauernheim (DE); Alexander Göthlich, Mannheim (DE)

(73) Assignee: BASF SE, Ludwigshafen (DE)

( * ) Notice: Subject to any disclaimer, the term of this patent is extended or adjusted under 35 U.S.C. 154(b) by 103 days.

(21) Appl. No.: 11/917,290

(22) PCT Filed: Jun. 13, 2006

(86) PCT No.: PCT/EP2006/063169
§ 371 (c)(1),
(2), (4) Date: Dec. 12, 2007

(87) PCT Pub. No.: WO2006/134117
PCT Pub. Date: Dec. 21, 2006

(65) Prior Publication Data
US 2008/0199714 A1    Aug. 21, 2008

(30) Foreign Application Priority Data
Jun. 14, 2005 (DE) .................. 10 2005 027 568

(51) Int. Cl.
*C23C 22/48* (2006.01)

(52) U.S. Cl. ........ 148/274; 148/253; 148/259; 148/283; 106/14.05; 106/14.11; 106/14.12; 106/14.13; 106/14.34; 106/14.35; 106/14.41

(58) Field of Classification Search ............... 106/14.05, 106/14.11, 14.12, 14.13, 14.34, 14.35, 14.41; 148/253, 259, 274, 285
See application file for complete search history.

(56) References Cited

U.S. PATENT DOCUMENTS

| 4,384,902 A | 5/1983 | Crotty et al. |
| 2004/0054044 A1 | 3/2004 | Bittner et al. |
| 2004/0062873 A1 | 4/2004 | Jung et al. |
| 2005/0163933 A1 | 7/2005 | Dietsche et al. |
| 2007/0176149 A1 | 8/2007 | Dietsche et al. |

FOREIGN PATENT DOCUMENTS

| CA | 2 312 807 A1 | 6/1999 |
| DE | 195 16 765 A1 | 11/1996 |
| DE | 197 54 108 A1 | 6/1999 |
| WO | WO-00/55391 A1 | 9/2000 |
| WO | WO-02/31064 A1 | 4/2002 |
| WO | WO-02/31222 A2 | 4/2002 |
| WO | WO-2004/000208 A2 | 12/2003 |
| WO | WO-2004/074372 A1 | 9/2004 |

*Primary Examiner* — Roy King
*Assistant Examiner* — Lois Zheng
(74) *Attorney, Agent, or Firm* — Connolly Bove Lodge & Hutz LLP

(57) ABSTRACT

Process for the passivation of metallic surfaces, in particular of strip metals, by treatment of the surface with an acidic, aqueous preparation which comprises at least one water-soluble acid group-containing polymer and at least one wax.

13 Claims, No Drawings

METHOD FOR THE PASSIVATION OF METAL SURFACES WITH COMPOSITIONS COMPRISING POLYMERS WITH ACID GROUPS AND WAXES

RELATED APPLICATIONS

This application is a national stage application (under 35 U.S.C. §371) of PCT/EP2006/063169, filed Jun. 13, 2006, which claims benefit of German application 10 2005 027 568.0, filed Jun. 14, 2005.

The present invention relates to a process for the passivation of metallic surfaces by treatment of the surface with an acidic, aqueous preparation which comprises at least one water-soluble acid group-containing polymer and at least one wax. The process is suitable in particular for the continuous passivation of strip metals.

Nowadays, long metal strips which are produced by hot rolling and/or cold rolling of metal blocks (so-called "slabs") and are wound into coils for storage and transportation are usually used as raw material for the production of sheet-like metallic workpieces, such as, for example, automotive parts, bodywork parts, equipment linings, façade claddings, ceiling claddings or window profiles.

The metal strips are divided and are shaped into the desired shaped articles by means of suitable techniques, such as punching, drilling, folding, conversion into profiles and/or deep drawing. Larger components, such as, for example, automotive bodyworks, are, if appropriate, joined by welding of a plurality of individual parts.

The corrosion protection treatment of such metallic materials is usually effected in multistage processes, and the surface of treated metals has a plurality of different layers. A corrosion protection treatment can be carried out at various points of the production process. This may be temporary corrosion protection as well as permanent corrosion protection. Temporary protection is applied, for example, only for storage and transportation of a metal strip or another metallic workpiece and is removed again before the final processing.

Corrosion protection layers which are applied to metal strips which are subsequently to be rejoined to give a shaped article must also have good mechanical properties in addition to the pure corrosion protection effect. In particular, the corrosion protection layers must have sufficient extensibility so that they do not break during working so that there is no longer sufficient corrosion protection at these points.

Of particular technical and economic importance are strips having a galvanized surface, in particular strips of electrogalvanized or hot-galvanized iron or steel. The corrosion protection of the zinc is based on the fact that it is less noble than the metallic material itself and therefore initially corrodes itself. The metallic material per se remains intact as long as it is still continuously covered with zinc. Furthermore of importance are metal strips of aluminum or aluminum alloys. In the presence of atmospheric oxygen, a thin oxide layer initially forms on the surface of the Zn or Zn alloys or Al or Al alloys and, depending on the external conditions, slows down to a greater or lesser extent the corrosive attack on the underlying metal.

In order to enhance the protective effect of such an oxide layer, Al and Zn surfaces are as a rule subjected to an additional passivation treatment. In the course of such a treatment, a part of the metal to be protected dissolves and is immediately thereafter again incorporated into an oxidic film on the metal surface. This film resembles the oxide film in any case present, but provides greater protection. It is usually referred to as a passivation layer. It frequently also improves the adhesion of paint coats applied to the metal. Instead of the term "passivation layer" the term "conversion layer" is therefore frequently used synonymously, sometimes also the term "pre-treatment layer". A passivation layer applied to strip steel immediately after galvanizing is occasionally also referred to as "aftertreatment layer". Passivation layers are comparatively thin and usually have a thickness of not more than 3 µm.

For enhancing the corrosion protection, as a rule addition (paint) coats are applied to the passivation layer. In general, these are a combination of a plurality of paint coats which in each case serve different purposes. They serve, for example, for protecting the passivation layer and the metal from corrosive gases and/or liquids but also from mechanical damage, such as, for example, stonechip, and of course also for aesthetic purposes. Paint coats are usually substantially thicker than passivation layers. Typical thicknesses range from 5 µm to 400 µm.

To date, passivation layers on zinc or aluminum surfaces have usually been obtained by treatment of the workpiece to be protected with aqueous, acidic solutions of $CrO_3$. The mechanism of such a passivation is complex. Inter alia, metallic Zn or Al is dissolved from the surface and is precipitated again in the form of amorphous zinc-chromium oxides or aluminum-chromium oxides. However, the layers may also comprise foreign ions and/or further components from the treatment solution. In the treatment with chromic acid, it is in particular impossible to avoid a certain proportion of Cr(VI) also being incorporated into the passivation layer.

In order to avoid the treatment with Cr(VI) solutions, the treatment with acidic, aqueous Cr(III) solutions has been proposed. Reference may be made by way of example to U.S. Pat. No. 4,384,902 or WO/40208. However, there are increasingly customers in the market who want completely chromium-free passivation processes. For avoiding the use of Cr(VI) as well as Cr(III), the use of polymers is therefore becoming increasingly important.

DE-A 195 16 765 discloses a chromium- and fluoride-free process for the production of conversion layers on metallic surfaces of Zn or Al. The acidic solution used for the passivation comprises a water-soluble polymer, phosphoric acid and Al chelate complexes. Optionally, polymers and co(polymers) of (meth)acrylic acid may also be used.

DE-A 197 54 108 discloses a chromium-free aqueous corrosion inhibitor which comprises hexafluoro anions of Ti(IV) and/or Zr(IV), vanadium ions, cobalt ions and phosphoric acid. Optionally, various film-forming polymers may furthermore be added, including copolymers containing carboxyl groups such as acrylic acid/maleic acid copolymers.

WO 2004/74372 discloses a process for the passivation of metal surfaces using copolymers of from 50 to 99.9% by weight of (meth)acrylic acid and from 0.1 to 50% by weight of acidic comonomers, such as, for example, ethylenically unsaturated dicarboxylic acids, and/or polymerizable phosphoric and/or phosphonic acids. The use of waxes is generally mentioned, but not the combination according to the invention.

WO 00/55391 discloses the use of vinylphosphonic acid homo- or copolymers in combination with $SiO_2$ for the treatment of metallic surfaces. The combination with waxes is not disclosed.

WO 02/31064 discloses a process for coating a metallic strip with a corrosion protection layer. For this purpose, an aqueous dispersion which comprises a water-soluble or water-dispersible polymer having an acid number of from 5 to 200, an inorganic compound in particulate form and at least one lubricant and/or at least one corrosion inhibitor is used. The lubricant may be a wax. The use of weakly acidic polymers having an acid number of only 5 to 200 is not within the scope of the present invention.

It was an object of the invention to provide an improved process for the passivation of metallic surfaces. It was intended in particular to facilitate the further processing of the passivated metal, for example during working. Preferably, this was to be a chromium-free process which can be used for the treatment of strip metals and shaped articles to be produced from strip metals.

Accordingly, a process for the passivation of metallic surfaces by treatment of the surface with an acidic, aqueous preparation which comprises at least one water-soluble polymer X comprising acidic groups,
  the polymer X having at least 0.6 mol of acid groups/100 g of the polymer,
  the pH of the preparation being not more than 5,
  the amount of the polymer being from 1 to 40% by weight, based on the amount of all components of the preparation,
  the preparation furthermore comprising at least one finely divided wax, and
  the amount of the wax being from 0.001 to 100% by weight, based on the total amount of all polymers X,
was found.

In a preferred embodiment of the invention the amount of the wax is 0.5 to 20% by weight, based on the total amount of all polymers X.

In a further preferred embodiment of the invention, the polymer X is a copolymer X1 which contains carboxyl groups and is composed of the following monomeric units— based in each case on the amount of all monomers incorporated as polymerized units in the copolymer:
(A) from 40 to 90% by weight of (meth)acrylic acid,
(B) from 50 to 60% by weight of at least one further monoethylenically unsaturated monomer which differs from (A) and has one or more acidic groups, and
(C) optionally from 0 to 30% by weight of at least one further ethylenically unsaturated monomer differing from (A) and (B).

Surprisingly, it was found that the combination described leads to substantially improved corrosion protection.

Regarding the invention, the following may be stated specifically:

The metallic surfaces which can be passivated by means of the process according to the invention, are in particular the surfaces of nonnoble metals. These may be, for example, the surface of iron, steel, Zn, Zn alloys, Al or Al alloys, Mg or Mg alloys. The steels may be both low-alloy and high-alloy steels.

The process according to the invention is particularly suitable for the passivation of metallic surfaces comprising Zn, Zn alloys, Al or Al alloys. These may be the surfaces of bodies or workpieces consisting entirely of said metals or alloys. However, they may also be the surfaces of bodies coated with Zn, Zn alloys, Al or Al alloys, it being possible for the bodies to consist of other materials, for example of other metals, alloys, polymers or composite materials. In particular, they may be the surface of galvanized iron or steel. The term "galvanized" does of course also comprise coating with a zinc alloy.

Zn or Al alloys are known to the person skilled in the art. The person skilled in the art chooses the type and amount of alloy constituents according to the desired use. Typical constituents of zinc alloys comprise in particular, Al, Mg, Pb, Si, Mg, Sn, Cu or Cd. Al/Zn alloys in which Al and Zn are present in approximately equal amounts are also possible. The coating may be substantially homogeneous coatings or coatings having concentration gradients. A possible example of this is galvanized steel to which Mg was additionally applied by vapor deposition. As a result, a Zn/Mg alloy may form on the surface. Typical constituents of aluminum alloys comprise in particular Mg, Mn, Si, Zn, Cr, Zr, Cu or Ti.

A preferred embodiment of the process relates to the surface of a strip metal, preferably comprising aluminum or aluminum alloys or iron or steel, in particular strips of electrogalvanized or hot-galvanized steel.

Furthermore, the surfaces are preferably those of shaped bodies which are obtainable from said strip metals by processing procedures such as cutting, working and/or joining. Examples comprise automotive bodyworks or parts thereof truck bodyworks, linings for household appliances, such as, for example, washing machines, dishwashers, washer-dryers, gas and electric cookers, microwave ovens, chest freezers or refrigerators, linings for technical equipment or apparatuses, such as, for example, machines, switch cabinets, computer housings or the like, components in the architectural sector, such as wall parts, façade elements, ceiling elements, window or door profiles or partitions, furniture comprising metallic materials, such as metal cabinets or metal shelves.

The metallic surfaces to be treated can of course also have thin oxidic/hydroxidic and/or carbonatic surface layers or layers of similar composition. Such layers usually form spontaneously on metallic surfaces in contact with the atmosphere and are included in the term "metallic surface".

The preparation used for the passivation comprises one or more water-soluble polymers X containing acid groups. The polymers X used may be homopolymers or copolymers. In the course of the treatment, the chemical nature of the metal surface changes.

The acidic groups are preferably selected from the group consisting of carboxyl groups, sulfo groups, phosphoric acid groups or phosphonic acid groups. They are particularly preferably carboxyl groups, phosphoric acid groups or phosphoric acid groups.

According to the invention, the polymers X used have at least 0.6 mol of acid groups/100 g of the polymer. This stated amount relates to the free acid groups. Preferably, the polymers have at least 0.9 mol of acid groups/100 g, particularly preferably at least 1 mol/100 g, very particularly preferably at least 1.2 mol/100 g.

The term water-soluble in the context of this invention is intended to mean that the copolymer or copolymers used should be homogeneously water-soluble. Aqueous dispersions of crosslinked polymer particles of essentially water-insoluble polymers are not within the scope of this invention.

The acid group-containing polymers X used should preferably be continuously miscible with water, even if this is not absolutely essential in every case. However, they must be water-soluble at least to a degree such that the passivation by means of the process according to the invention is possible. As a rule, the copolymers used should have a solubility of at least 50 g/l, preferably 100 g/l and particularly preferably at least 200 g/l.

It is known to the person skilled in the art in the area of polymers that the solubility of acid group-containing polymers in water may be dependent on the pH. The pH desired for the respective intended use should therefore be chosen in each case as a reference point. A polymer which has insufficient solubility for the intended use at a certain pH may have a sufficient solubility at another pH.

The polymer X used is preferably a copolymer of at least two different acid group-containing monomers. For example, it may be a copolymer of (meth)acrylic acid and other acidic monomers, such as maleic acid, itaconic acid and/or vinylphosphonic acid. The copolymer may furthermore optionally comprise further monomers without acid-containing groups. The amount of such monomers should, however, not exceed 30% by weight, based on the total amount of all monomers incorporated as polymerized units into the copolymer.

In a particularly preferred embodiment of the invention, the polymer X is one or more water-soluble copolymers X1 comprising (meth)acrylic acid units (A), monoethylenically unsaturated monomers differing therefrom and having acidic groups (B) and optionally further monomers (C) as structural units.

The monomer (A) for the preparation of the copolymer X1 is (meth)acrylic acid. It is of course also possible to use mixtures of acrylic acid and methacrylic acid.

The amount of (meth)acrylic acid in the copolymer X1 is from 40 to 90% by weight, preferably from 50 to 80% by weight and particularly preferably from 50 to 70% by weight, these data being based on the sum of all monomers in the polymer.

The monomer (B) is, at least one monoethylenically unsaturated monomer which differs from (A) but is copolymerizable with (A) and has one or more acidic groups. It is of course also possible to use a plurality of different monomers (B).

The acidic groups may be, for example, carboxyl groups, phosphoric acid groups, phosphonic acid groups or sulfo groups, without it being intended to limit the invention to these acid groups.

Examples of such monomers comprise crotonic acid, vinylacetic acid, $C_1$-$C_4$ monoesters of monoethylenically unsaturated dicarboxylic acids, styrenesulfonic acid, vinylsulfonic acid, acrylamidopropanesulfonic acid, vinylphosphonic acid, monovinyl phosphate, maleic acid, fumaric acid or itaconic acid.

The amount of the monomers (B) in the copolymer X1 is from 5 to 60% by weight, preferably from 20 to 50% by weight and particularly preferably from 30 to 50% by weight, based in each case on the sum of all monomers in the polymer.

In a preferred embodiment of the invention, the monomers (B) are monoethylenically unsaturated dicarboxylic acids having 4 to 7 carbon atoms (B1) and/or monoethylenically unsaturated phosphoric and/or phosphonic acids (B2).

Examples of monomers (B1) comprise maleic acid, fumaric acid, methylfumaric acid, methylmaleic acid, dimethylmaleic acid, methylenemalonic acid or itaconic acid. The monomers can, if appropriate, also be used in the form of the corresponding cyclic anhydrides. Maleic acid, fumaric acid and itaconic acid are preferred, and maleic acid and maleic anhydride are particularly preferred.

Examples of monomers (B2) comprise vinylphosphonic acid, monovinyl phosphate, allylphosphonic acid, monoallyl phosphate, 3-butenylphosphonic acid, mono-3-butenyl phosphate, 4-vinyloxybutyl phosphate, phosphonoxyethyl acrylate, phosphonoxyethyl methacrylate, mono(2-hydroxy-3-vinyloxypropyl) phosphate, (1-phosphonoxy-methyl-2-vinyloxyethyl) phosphate, mono(3-allyloxy-2-hydroxypropyl) phosphate, mono-2-(allyloxy-1-phosphonoxymethylethyl) phosphate, 2-hydroxy-4-vinyloxymethyl-1,3,2-dioxaphosphol, 2-hydroxy-4-allyloxymethyl-1,3,2-dioxaphosphol. They are preferably vinylphosphonic acid, monovinyl phosphate or allylphosphonic acid, and vinylphosphonic acid is particularly preferred.

In addition to the monomers (A) and (B), optionally from 0 to 30% by weight of at least one further ethylenically unsaturated monomer (C) differing from (A) and (B) may be used. Over and above this, no other monomers are used.

The monomers (C) serve for fine control of the properties of the copolymer X1. It is of course also possible to use a plurality of different monomers (C). They are chosen by the person skilled in the art according to the desired properties of the copolymer and furthermore with the proviso that they must be copolymerizable with the monomers (A) and (B).

As in the case of (A) and (B), they are preferably monoethylenically unsaturated monomers. In particular cases, however, small amounts of monomers having a plurality of polymerizable groups can also be used. As a result of this, the copolymer can be crosslinked to a small extent.

Examples of suitable monomers (C) comprise in particular alkyl esters or hydroxyalkyl esters of (meth)acrylic acid, such as methyl (meth)acrylate, ethyl (meth)acrylate, butyl (meth)acrylate, 2-ethylhexyl (meth)acrylate, hydroxyethyl (meth)acrylate, hydroxypropyl (meth)acrylate or butanediol 1,4-monoacrylate. Furthermore suitable are vinyl or allyl ethers, such as, for example, methyl vinyl ether, ethyl vinyl ether, propyl vinyl ether, 2-ethylhexyl vinyl ether, vinyl cyclohexyl ether, vinyl-4-hydroxybutyl ether, decyl vinyl ether, 2-(diethylamino)ethyl vinyl ether, 2-(di-n-butylamino)ethyl vinyl ether or methyldiglycol vinyl ether or the corresponding allyl compounds. It is also possible to use vinyl esters, such as, for example, vinyl acetate or vinyl propionate. Basic comonomers, for example acrylamide and alkyl-substituted acrylamides, may also be used. Alkoxylated monomers, in particular ethoxylated monomers, may also be used. Alkoxylated monomers which are derived from acrylic acid or methacrylic acid are particularly suitable.

Examples of crosslinking monomers comprise molecules having a plurality of ethylenically unsaturated groups, for example, di(meth)acrylates, such as ethylene glycol di(meth)acrylate or butanediol 1,4-di(meth)acrylate, or poly(meth)acrylates such as trimethylolpropane tri(meth)acrylate, or di(meth)acrylates of oligo- or polyalkylene glycols, such as di-, tri- or tetraethylene glycol di(meth)acrylate. Further examples comprise vinyl (meth)acrylate or butanediol divinyl ether.

The amount of all monomers (C) used together is from 0 to 30% by weight, based on the total amount of monomers used. Preferably, the amount is from 0 to 20% by weight, particularly preferably from 0 to 10% by weight. If crosslinking monomers (C) are present the amount thereof should as a rule not exceed 5%, preferably 2% by weight, based on the total amount of all monomers used for the process. It may be, for example, from 10 ppm to 1% by weight.

In a particularly preferred embodiment of the invention, the copolymer X1 comprises, in addition to (A), at least one monomer (B1) and at least one monomer (B2).

Furthermore, particularly preferably no further monomers (C) are present in addition to the monomers (A), (B1) and (B2).

Copolymers X1 of monomers (A), (B1) and (B2) are preferred for carrying out the present invention, the amount of (A) being from 50 to 90% by weight, the amount of (B1) being from 5 to 45% by weight, the amount of (B2) being from 5 to 45% by weight and the amount of (C) being from 0 to 20% by weight. (B1) and (B2) may in each case be only one monomer (B1) or (B2) or may in each case be two or more different monomers (B1) or (B2).

Particularly preferably, the amount of (A) is from 50 to 80% by weight, the amount of (B1) is from 12 to 42% by weight, the amount of (B2) is from 8 to 38% by weight and the amount of (C) is from 0 to 10% by weight.

Very particularly preferably, the amount of (A) is from 50 to 70% by weight, the amount of (B1) is from 15 to 35% by weight, the amount of (B2) is from 15 to 35% by weight and the amount of (C) is from 0 to 5% by weight.

Particularly preferably, said copolymer X1 is a copolymer X1 of acrylic acid, maleic acid and vinylphosphonic acid in the amounts mentioned above.

The components (A), (B) and optionally (C) can be polymerized with one another in a manner known in principle. Corresponding polymerization techniques are known to the person skilled in the art. Preferably, the copolymers are prepared by free radical polymerization of said components (A), (B) and optionally (C) in aqueous solution. In addition, small amounts of water-miscible organic solvents may also be present, and, if appropriate, small amounts of emulsifiers. Details for carrying out a free radical polymerization are known to the person skilled in the art.

In the case of the acidic monomers, in each case the free acids can be used for the preparation of the copolymers X1. However, the preparation of the polymers can also be effected by using for the polymerization in the case of the acidic monomers not the free acids but in the form of their esters, anhydrides or other hydrolyzable derivatives. These may hydrolyze in the course of or after the polymerization in aqueous solution to give the corresponding acid groups. In particular, maleic acid or other cis-dicarboxylic acids can advantageously be used as cyclic anhydrides. These hydrolyze as a rule very rapidly in aqueous solution to give the corresponding dicarboxylic acids. Other acidic monomers, in particular the monomers (A) and (B2), are preferably used as free acids.

The polymerization can furthermore also be carried out in the presence of at least one base. This makes it possible in particular to improve the incorporation of monomers (B1), such as, for example, maleic acid, into the polymer so that the proportion of dicarboxylic acids not incorporated in the form of polymerized units is kept low.

Suitable bases for the neutralization are in particular ammonia, amines, aminoalcohols or alkali metal hydroxides. It is of course also possible to use mixtures of different bases. Preferred amines are alklyamines having up to 24 carbon atoms and amino alcohols which have up to 24 carbon atoms and structural units of the type —N—$C_2H_4$—O— and —N—$C_2H_4$—OH and —N—$C_2H_4$—O—$CH_3$. Examples of such amino alcohols comprise ethanolamine, diethanolamine, triethanolamine and their methylated derivatives. The bases can be added before or during the polymerization. It is of course also possible to polymerize without bases and optionally to add base after the polymerization. As a result of this, the pH of the polymer can be optimally adjusted.

The degree of neutralization should, however, by no means be too high, but sufficient free acid groups should still be present in the polymer. Particularly good adhesion of the polymers to the metal surface is achieved by free acid groups. As a rule, not more than 40% of the acid groups present in the polymer X or copolymer X1 should be neutralized, preferably from 0 to 30 mol %, particularly preferably from 0 to 20 mol %, very particularly preferably from 0 to 12 mol % and for example from 2 to 10 mol %.

The free radical polymerization is preferably initiated by the use of suitable thermally activatable polymerization initiators.

The initiators used can in principle be all compounds decomposing into free radicals under the polymerization conditions. Among the thermally activatable polymerization initiators, initiators having a decomposition temperature in the range of from 30 to 150° C., in particular from 50 to 120° C., are preferred. These temperature data relate as usual to the 10 h half-life.

The person skilled in the art makes a suitable choice from the initiators which are suitable in principle. The free radical initiators should be soluble to a sufficient extent in the solvent of the reaction. If only water is used as the solvent the initiators should have sufficient water solubility. If the procedure is effected in organic solvents or mixtures of water and organic solvents, it is also possible to use initiators soluble in organic media. Water-soluble initiators are preferably used.

Examples of suitable initiators comprise inorganic peroxo compounds, such as peroxodisulfates, in particular ammonium, potassium and preferably sodium peroxodisulfate, peroxosulfates, hydroperoxides, percarbonates and hydrogen peroxide and the so-called redox initiators. In some cases, it is advantageous to use mixtures of different initiators, for example, mixtures of hydrogen peroxide and sodium or potassium peroxodisulfate. Mixtures of hydrogen peroxide and sodium peroxodisulfate can be used in any desired ratio.

Furthermore, organic peroxo compounds such as diacetyl peroxide, di-tert-butyl peroxide, diamyl peroxide, dioctanoyl peroxide, didecanoyl peroxide, dilauroyl peroxide, dibenzoyl peroxide, bis(o-toloyl) peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, tert-butyl peroxide, tert-butyl hydroperoxide (water-soluble), cumyl hydroperoxide, tert-butyl peroxy-2-ethylhexanoate and diisopropyl peroxidicarbamate, can also be used.

Other preferred initiators are azo compounds. Examples of suitable water-soluble azo compounds comprise 2,2'-azobis[2-(5-methyl-2-imidazolin-2-yl)propane]dihydrochloride, 2,2'-azobis[2-(2-imidazolin-2-yl)propane disulfate dihydrate, 2,2'-azobis[N-(2-carboxyethyl)-2-methylpropionamidine]tetrahydrate, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyl] propionamide, 2,2'-azobis[2-methyl-N-(2-hydroxyethyl) propionamide], 2,2'-azobis[2-(2-imidazolin-2-yl)propane] dihydrochloride, 2,2'-azobis(2-methylpropionamide) dihydrochloride, 2,2'-azobis[2-(3,4,5,6-tetrahydropyrimidin-2-yl)propane]dihydrochloride, 2,2'-azobis[2-(2-imidazolin-2-yl)propane], 2,2'-azobis{2-methyl-N-[2-(1-hydroxybutyl)]propionamide}.

Examples of azo compounds soluble in organic solvents comprise 2,2'-azobis(4-methoxy-2,4-dimethyl valeronitrile), dimethyl 2,2'-azobis(2-dimethylpropionate), 1,1'-azobis(cyclohexane-1-carbonitrile), 1-[(cyano-1-methylethyl)azo]formamide, 2,2'-azobis(N-cyclohexyl-2-methylpropionamide), 2,2'-azobis(2,4-dimethyl valeronitrile), 2,2'-azobis(2-methylbutyronitrile), 2,2'-azobis[N-(2-propenyl)-2-methylpropionamide], 2,2'-azobis(N-butyl-2-methylpropionamide).

Further preferred initiators are redox initiators. Redox initiators comprise at least one of the abovementioned peroxo compounds as the oxidizing component and, for example, ascorbic acid, glucose, sorbose, ammonium or alkali metal hydrogen sulfite, sulfite, thiosulfate, hyposulfite, pyrosulfite or sulfide or sodium hydroxymethylsulfoxylate as the reducing component. Preferably, ascorbic acid or sodium pyrosulfite is used as the reducing component of the redox catalyst. Based on the amount of monomers used in the polymerization, for example, from $1 \times 10^{-5}$ to 1 mol % of the reducing component of the redox catalyst is used.

In combination with the initiators or redox initiator systems, transition metal catalysts may additionally be used, for example salts of iron, cobalt, nickel, copper, vanadium and manganese. Suitable salts are, for example, iron(II) sulfate, cobalt(II) chloride, nickel(II) sulfate, copper(I) chloride. The reducing transition metal salt is usually used in an amount of from 0.1 to 1000 ppm, based on the sum of the monomers. For example, combinations of hydrogen peroxide and iron(II) salts are particularly advantageous, such as a combination of from 0.5 to 30% by weight of hydrogen peroxide in from 0.1 to 500 ppm of $FeSO_4.7H_2O$, based in each case of the sum of the monomers.

In a manner known in principle, it is also possible to use suitable regulators, such as, for example, mercaptoethanol. Preferably, no regulators are used.

Thermal initiators are preferably used, water-soluble azo compounds and water-soluble peroxo compounds being preferred. Hydrogen peroxide and sodium peroxodisulfate or mixtures thereof, if appropriate in combination with from 0.1 to 500 ppm of $FeSO_4.7H_2O$, are very particularly preferred.

However, the polymerization can alternatively also be initiated, for example, by suitable radiation. Examples of suitable photoinitiators comprise acetophenone, benzoin ethers, benzyl dialkyl ketones and derivatives thereof.

Of course, it is also possible to use mixtures of different initiators provided that they do not have an adverse affect on one another. The amount is determined by the person skilled in the art according to the desired copolymer X1. As a rule, from 0.05% by weight to 30% by weight, preferably from 0.1 to 15% by weight and particularly preferably from 0.2 to 8% by weight of the initiator, based on the total amount of all monomers, are used.

In a manner known in principle, it is also possible to use suitable regulators, such as, for example, mercaptoethanol. Preferably, no regulators are used.

The free radical polymerization is preferably carried out at a temperature of less than 130° C. Apart from this, the temperature can be varied by the person skilled in the art within wide limits depending on the type of monomers used, type of initiator and the desired copolymer. A minimum temperature of 60° C. has proven useful here. The temperature can be kept constant during the polymerization or temperature profiles may also be used. The polymerization temperature is preferably from 75 to 125° C., particularly preferably from 80 to 120° C., very particularly preferably from 90 to 110° C. and, for example from 95 to 105° C.

The polymerization can be carried out in conventional apparatuses for free radical polymerization. If the procedure is effected at above the boiling point of water or of the mixture of water and further solvents, a suitable pressure vessel is employed; otherwise the procedure can be effected at atmospheric pressure.

The copolymers X1 synthesized can be isolated from the aqueous solution by means of conventional methods known to the person skilled in the art, for example by evaporating down the solution, spray-drying, freeze-drying or precipitation. However, the copolymers X1 are preferably not isolated at all from the aqueous solution after the polymerization, but the resulting solutions of the copolymers are used as such for the process according to the invention.

For carrying out the process according to the invention, an acidic, aqueous preparation Z1 of the polymers X is used. This can of course be a mixture of a plurality of different polymers X. Copolymers X1 are preferred.

The molecular weight $M_w$ (weight average) of the polymers X used for the process according to the invention is determined by the person skilled in the art according to the desired use. For example, polymers having a molecular weight $M_w$ of from 3000 to 1 000 000 g/mol may be used. Polymers of from 5000 g/mol to 500 000 g/mol, preferably from 10 000 g/mol to 250 000 g/mol, particularly preferably from 15 000 to 100 000 g/mol and very particularly preferably from 20 000 to 75 000 g/mol have proven particularly useful.

The preparation preferably comprises only water as the solvent. It may also comprise water-miscible organic solvents. Examples comprise monoalcohols, such as methanol, ethanol or propanol, higher alcohols, such as ethylene glycol, or polyether polyols and ether alcohols, such as butyl glycol or methoxypropanol. As a rule, the amount of water is, however, at least 80% by weight, preferably at least 90% by weight and very particularly preferably at least 95% by weight. The data are based in each case on the total amount of all solvents.

Advantageously, the polymer-containing solutions which result from the polymerization can be directly used, which solutions, if appropriate, are further diluted. In order to facilitate such direct further use, the amount of aqueous solvent used for the polymerization should from the outset be such that the concentration of the polymer in the solvent is suitable for the application.

The concentration of the polymers X in the preparation Z1 is from 1 to 40% by weight, based on the amount of all components of the formulation. Preferably, the amount is from 2 to 35% by weight and particularly preferably from 5 to 25% by weight. The properties of the preparation, for example, the viscosity thereof or the pH thereof, can be influenced by the concentration and the type of polymers used. The properties of the preparation can thus be optimally adapted to a certain process technique for the treatment. Thus, a concentration of from 5 to 15% by weight has proven useful, for example, in the case of a squeegee technique, and a concentration of from 15 to 25% by weight in the case of application by means of coating rolls. The stated concentrations are based on the ready-to-use preparation. It is also possible initially to prepare a concentrate which is diluted to the desired concentration with water or optionally other solvent mixtures only on site.

The preparation Z1 used according to the invention has a pH of not more than 5, in particular a pH of from 0.5 to 5, preferably from 1.5 to 3.5. The pH of the preparation can be controlled, for example, by the type and concentration of the polymers used according to the invention. Of course, the degree of neutralization of the polymer plays a decisive role here.

The preparation comprises at least one finely divided wax dispersed in the formulation as a further component. The term "wax" is known to the person skilled in the art and is defined, for example, in Römpp-Lexikon "Lacke und Druckfarben", Georg Thieme Verlag, Stuttgart, New York 1998, pages 615/616 or "Ullmann's Encyclopedia of Industrial Chemistry, 6th Edition, Electronic Release; Waxes; 1.2. Definition". Among these, the person skilled in the art also includes PTFE waxes although these are actually not waxes in the sense of the definition (cf. for example Römpp, loc. cit. pages 466/467). The term "wax" comprises both the actual wax and assistants optionally used for the formation of a wax dispersion. Waxes for use in aqueous dispersions are known to the person skilled in the art and he makes a suitable choice. Of course, a mixture of different waxes can also be used.

Examples of suitable waxes for carrying out the present invention comprise [CAS numbers in square brackets]:
paraffin wax [8002-74-2]
polyethylene wax [9002-88-4]
polyethylene-polypropylene waxes
copolymeric polyethylene waxes, for example copolymers of ethylene with acrylic acid, methacrylic acid, maleic anhydride, vinyl acetate, vinyl alcohol, for example [38531-18-9], [104912-80-3], [219843-86-4] or copolymers of ethylene with a plurality of these monomers
polybutene waxes Fischer-Tropsch waxes
oxidized waxes, for example oxidized polyethylene wax corresponding to [68441-17-8]
polar modified polypropylene waxes, for example [25722-45-6]
microcrystalline waxes, for example microcrystalline paraffin waxes [63231-60-7]
montan wax and montan wax raffinates, for example [8002-53-7]
montanic acids, for example [68476-03-9]
metal salts of montanic acids, for example sodium salts [93334-05-5] and calcium salts [68308-22-5]
esters of long-chain carboxylic acids with long-chain alcohols, for example octadecyl stearate [2778-96-3]
montanic acid esters of polyhydric alcohols, for example
montan wax glycerides [68476-38-0], also partly hydrolyzed
montanic acid esters of trimethylolpropane [73138-48-4], also partly hydrolyzed
montanic acid esters of 1,3-butanediols [73138-44-0], also partly hydrolyzed
montanic acid esters of ethylene glycol [73138-45-1], also partly hydrolyzed
montan wax ethoxylates, for example [68476-04-0]
fatty acid amides, for example erucamide [112-84-5], oleamide [301-02-0] and 1,2-ethylenebis(stearamide) [110-30-5]
long-chain ethers, for example octadecyl phenyl ether
carnauba wax.
Furthermore, mixture of waxes are suitable, for example
mixtures of octadecyl stearate and partly hydrolyzed montanic acid esters of polyhydric alcohols
mixtures of paraffin waxes and partly hydrolyzed montanic acid esters of polyhydric alcohols and/or montanic acids
mixtures of polyethylene wax and polyethylene glycol.

The waxes may also have acid functions, in particular carboxyl groups, which may be present in neutralized or unneutralized form. Waxes having an acid number of <200 mg KOH/g are preferred. An acid number of from 3 to 80 mg KOH/g is particularly preferred.

Other preferred waxes are those which have a melting point. As a rule, the melting point is from 40 to 200° C., preferably from 60 to 170° C., particularly preferably from 100 to 160° C. Waxes having a melting point of from 120 to 135° C. and from 145 to 160° C. are particularly preferred.

Preferred waxes are oligomeric or polymeric substances which have a molecular weight $M_n$ greater than 200 g/mol, preferably greater than 400 g/mol, and which have a proportion by weight of more than 60% by weight of structural elements selected from the group consisting of (—CH$_2$—CH$_2$—)
(—CH$_2$—CH<)
(CH$_2$—CH(CH$_3$)—)
(CH$_3$)
(CR$_2$—CR$_2$—) and (—CR$_2$—CR(CR$_3$)—)

R being H and/or F$_1$ and with the proviso that said structural elements are linked to one another so that they predominantly comprise units of at least 12 carbon atoms directly linked to one another.

Waxes having such structural elements may be in particular polyethylene and/or polypropylene waxes or derivatives thereof. Such waxes generally have an average molecular weight $M_n$ of from 400 to 30 000 g/mol, preferably from 1000 to 25 000 g/mol and particularly preferably from 1500 to 20 000 g/mol. In addition to the main monomers ethylene or propylene, the waxes optionally comprise further comonomers as secondary constituents. Further comonomers may be, for example, other α-olefins, vinyl acetate or monomers having acidic groups. Examples of monomers having acidic groups comprise acrylic acid, methacrylic acid, vinylphosphonic acid, maleic acid or maleic anhydride or vinyl acetic acid. Acidic monomers are preferably acrylic acid and/or methacrylic acid. For example, ethylene-(meth)acrylic acid waxes having an ethylene content of from 75 to 99% by weight, from 1 to 25% by weight of (meth)acrylic acid and optionally from 0 to 10% by weight of further monomers are suitable. These may be in particular vinylphosphonic acid and/or vinylphosphonic esters.

Examples of derivatives of waxes comprise oxidized polyolefin waxes, in particular oxidized polyethylene waxes. Oxidized polyethylene waxes have various oxygen-containing groups on the polyethylene skeleton, such as, for example, OH groups, keto groups and in particular COOH groups.

The preparation of (oxidized) polyolefin waxes is known in principle to the person skilled in the art. Details can be obtained from, for example, "Ullmann's Encyclopedia of Industrial Chemistry, 6th Edition, Electronic Release; Waxes.

Particularly preferred waxes are those which, owing to their state on delivery, can be particularly easily incorporated into the formulation for the method according to the invention, such as, for example, micronized waxes and/or wax dispersions.

Micronized waxes are particularly finely divided powder having a mean particle size of preferably less than 20 µm, particularly preferably from 2 to 15 µm. Wax dispersions are aqueous preparations of waxes which comprise water, optionally further, water-miscible solvents, spherical wax particles and as a rule assistants. Preferred wax dispersions for use in the present invention have a particle size of less than 1 µm, preferably from 20 to 500 nm, particularly preferably from 50 to 200 nm. Micronized waxes and finished wax dispersion are commercially available.

Assistants are used in wax dispersions, for example, in order to ensure the dispersibility of the wax and the shelf-life thereof. The assistants may be, for example, bases for neutralizing or partly neutralizing acid functions in the wax, for example alkali metal hydroxides, ammonia, amines or alkanolamines. Acid groups may also be neutralized or partly neutralized with cations, for example Ca$^{++}$ or Zn$^{++}$ Furthermore they may be surface-active substances, preferably nonionic surfactants or anionic surfactants. Examples of nonionic surfactants comprise ethoxylates and propoxylates based on alcohols and hydroxyaromatics and sulfation and sulfonation products thereof. Examples of anionic surfactants comprise alkylsulfonates, arylsulfonates and alkylarylsulfonates.

Wax dispersions having a pH of less than 7, preferably having a pH of less than 6, are particularly suitable for carrying out the present invention.

According to the invention, the wax can be used in an amount of from 0.001 to 100% by weight, for example in an amount of from 0.01 to 70% by weight and in particular from 0.1 to 50% by weight, based in each case on the total amount of all polymers X containing acid groups. The amount is determined by the person skilled in the art, for example according to the copolymers used, the other constituents of the formulation and the desired properties of the layer.

As a rule, the amount of wax used is from 0.5 to 20% by weight, in particular from 1 to 18% by weight. The amount is particularly preferably from 1 to 15% by weight, very particularly preferably from 2 to 8% by weight and, for example, from 1 to 5% by weight, based in each case on the total amount of all polymers X containing acid groups.

The particular advantage of the process according to the invention is that outstanding results are achieved even with preparations which comprise only the components described. The preparation can, however, optionally comprise further components over and above said components.

Inorganic or organic acids or mixtures thereof may be mentioned in particular as further components. The choice of such an acid is not limited provided that there are no adverse effects together with the other components of the formulation. The person skilled in the art makes an appropriate choice.

Examples of suitable acids comprise phosphoric acid, phosphonic acid or organic phosphonic acids, such as 1-hydroxyethane-1,1-diphosphonic acid (HEDP), 2-phosphonobutane-1,2,4-tricarboxylic acid (PBTC), aminotri(methylenephosphonic acid) (ATMP), ethylenediaminetetra (methylenephosphonic acid) (EDTMP) or diethylenetriaminepenta(methylenephosphonic acid) (DTPMP), sulfonic acids, such as methanesulfonic acid, amidosulfonic acid, p-toluenesulfonic acid, m-nitrobenzenesulfonic acid and derivatives thereof, nitric acid, formic acid, or acetic acid. Phosphorous-containing acids, such as $H_3PO_4$, phosphonic acid, said organic phosphonic acids and/or $HNO_3$ are preferred and $H_3PO_4$ is particularly preferred. If an additional acid is present at all, the formulation very particularly preferably comprises exclusively $H_3PO_4$ as the acid.

The preparation may optionally furthermore comprise at least one dissolved metal ion or a dissolved metal compound, for example of Al, Mg, Ca, Ni, Co, V, Fe, Zn, Zr, Mn, Mo, W, T, Zr. The compound may be used, for example, in the form of the respective aqua complexes. However, they may also be complexes with other ligands, such as, for example, fluoride complexes of Ti(IV), Zr(IV) or oxometallates, such as, for example, $MoO_4^{2-}$ or $WO_4^{2-}$, or the compounds may also be used in the form of complexes with typical chelate-forming ligands, such as ethylenediaminetetraacetic acid (EDTA), diethylenetriaminepentacetic acid (DTPA), hydroxyethylenediamine-triacetic acid (HEDTA), nitrilotriacetic acid (NTA) or methylglycinediacetic acid (MGDA). Furthermore, it is of course possible for the complex bonds to the carboxyl groups or other acidic groups of the polymer X to be present. Preferred preparations are those which comprise no chromium compounds. Furthermore, preferably no metal fluorides or complex metal fluorides should be present. The passivation according to the invention is therefore preferably a chromium-free passivation, particularly preferably a chromium- and fluoride-free passivation.

In a preferred embodiment of the invention, the preparation comprises at least one soluble metal ion selected from the group consisting of $Zn^{2+}$. $Mg^{2+}$, $Ca^{2+}$ or $Al^{3+}$, preferably $Zn^{2+}$, $Mg^{2+}$ and $Ca^{2+}$. The ions may be present as hydrated metal ions, but they may also be present in the form of dissolved compounds, for example as complex compounds with the above-mentioned complexing agents. In particular, the ions may have complex bonds to the acidic groups of the polymer. They are preferably $Zn^{2+}$ or $Mg^{2+}$ and very particularly preferably $Zn^{2+}$. The preparation preferably comprises no further metal ions.

The amount of metal ions from the group consisting of $Zn^{2+}$, $Mg^{2+}$, $Ca^{2+}$ or $Al^{3+}$ is determined by the person skilled in the art according to the desired properties of the preparation. Said amount is as a rule from 0.001% by weight to 20% by weight, preferably from 0.005 to 15% by weight, particularly preferably from 0.01 to 12% by weight and very particularly preferably from 0.03 to 10% by weight, based in each case on the total amount of all polymers X in the formulation.

The formulation can furthermore comprise at least one dissolved phosphate ion. It preferably comprises phosphate ions, if metal ions from the group consisting of $Zn^{2+}$, $MG^{2+}$, $Ca^{2+}$ or $Al^{3+}$ are present. Said ion may be all types of phosphate ions. For example, said ions may be the orthophosphates or diphosphates. For the person skilled in the art, it is clear that an equilibrium may be present between the different dissociation states of the ions in aqueous solution, depending on pH and concentration.

The amount of the phosphate ions in the formulation is determined by the person skilled in the art according to the desired properties of the formulation. Said amount is as a rule from 0.01% by weight to 20% by weight, preferably from 0.5 to 20% by weight, particularly preferably from 1 to 20% by weight and very particularly preferably from 5 to 20% by weight, calculated in each case as orthophosphoric acid and based in each case on the polymers X.

The metal ions, in particular the metal ions from the group consisting of $Zn^{2+}$, $Mg^{2+}$ or $Ca^{2+}$ and phosphate ions can preferably be used in the form of soluble salts, both of which comprise ions. Examples of such compounds comprise $Zn_3(PO_4)_2$, $ZnH_2PO_4$, $Mg_3(PO_4)_2$ or $Ca(H_2PO_4)_2$ or corresponding hydrates thereof.

The ions can, however, also be added separately from one another. For example, the metal ions can be used in the form of the corresponding nitrates, and the phosphates can be used in the form of phosphoric acid. It is also possible to use insoluble or sparingly soluble compounds, such as, for example, the corresponding carbonates, oxides, hydrated oxides or hydroxides, which are dissolved under the influence of acid.

Further optional components of the preparation comprise surface-active compounds, corrosion inhibitors, complexing agents, typical galvanization assistants or further polymers to be distinguished from the polymers X used according to the invention. Further possible additives are conventional coating additives, as described in *H. Kiffel (Editor.) Lehrbuch der Lacke und Beschichtungen, Volume 5-Pigmente, Füllstoffe und Farbmetrik*-2nd edition, S. Hirzel-Verlag Stuttgart 2003.

The person skilled in the art makes an appropriate choice from the optional components possible in principle and with regard to their amount according to the desired use. However, the amount of optional components should as a rule be not more than 20% by weight, preferably not more than 10% by weight and particularly preferably not more than 5% by weight based on the polymers X.

The preparations used according to the invention can be obtained by simple mixing of the components. The waxes are preferably first dispersed separately in water and mixed as a dispersion with the other components. Such wax dispersions are also commercially available.

For passivating metal surfaces, the surface of the metal is brought into contact with the preparation, for example by spraying, immersion or rolling on.

A number of possibilities exist with regard to the process technique for carrying out the passivation. These depend, inter alia, on the shape of the workpiece, for example whether a still unshaped, flat metal strip or a metal sheet or a shaped body which has, for example, curved surfaces or edges is used. The treatment may also comprise a plurality of individual process steps. Continuous or batchwise processes may be used. The person skilled in the art makes a suitable choice from the possible processes.

The treatment can be carried out, for example, by immersion in the preparation or by spraying or coating with the preparation. On metal strips and metal sheets, the preparation can preferably be rolled on. A metal strip can also be coated in a continuous process. The metal strip is passed through a tank or a spray apparatus with the preparation. A continuous process for the production of steel strips may also comprise a galvanization station followed by an apparatus for the passivation with the preparation.

In the case of rolling on, as a rule the coating material is taken up from a trough by a take-up roll and then transferred to an applicator roll. The applicator roll transfers the coating material to the strip. Take-up roll and applicator roll can be coupled via a roll which is located in between and via which the coating material is transferred. The rolls may rotate in the same direction or in the opposite direction and run with or against the strip direction. The result of the coating may additionally be determined by the choice of the contact pressure of the roll on the strip and by the roughness and hardness of the roller.

After an immersion process or spray process, the workpiece can be allowed to drip off to remove excess treatment solution; in the case of metal sheets, metal foils or the like, however, excess treatment solution can, for example, also be removed by means of a squeegee or doctor blade. It is also possible to rinse the surface after the treatment with a cleaning liquid, in particular with water, in order to remove residues of the preparation used from the surface.

In an alternative embodiment, the treatment may also be a so-called "no-rinse" process in which the treatment solution is dried in directly in a drying oven immediately after the application without rinsing off.

The treatment with the preparation can be effected at room temperature or at elevated temperatures. As a rule, the treatment is effected at from 20 to 90° C., preferably from 25 to 80° C. and particularly preferably from 30 to 60° C. For this purpose, for example, a bath with the preparation can be heated, but an elevated temperature may also be automatically established by immersing warm metal a bath.

The duration of treatment is determined by the person skilled in the art according to the desired properties of the layer, the composition used for the treatment and the general technical conditions. It may be substantially less than one second or may be several minutes. In the continuous process, it has proven particularly useful to bring the surface into contact with the preparation for a duration of from 1 to 60 s.

After the treatment, the solvent used, i.e. as a rule the water, is removed. The removal can be effected at room temperature by simple evaporation in air at room temperature.

The removal of the solvent can, however, also be promoted by suitable assistants, for example by heating and/or by passing over gas streams, in particular air streams. The evaporation of the solvent can be promoted, for example, by IR lamps or, for example, by drying in a drying tunnel. A temperature of from 30° C. to 160° C., preferably from 40° C. to 100° C. and particularly preferably from 50° C. to 80° C. has proven useful for drying. What is meant thereby is the peak metal temperature (PMT), which can be measured by methods familiar to the person skilled in the art (for example, noncontact infrared measurement or determination of the temperature using adhesively bonded test strips). The drying temperature must, if appropriate, be set higher and is appropriately chosen by the person skilled in the art.

The process according to the invention may optionally also comprise one or more pretreatment steps. For example, the metallic surface can be cleaned before the passivation with a preparation used according to the invention, for example to remove fats or oils. Furthermore, it can also be pickled prior to the passivation, in order to remove oxidic deposits, scale, temporary corrosion protection and the like. Furthermore, the surface must, if appropriate, also be washed with water after and between such pretreatment steps, and to remove the residues of wash solutions or pickling solutions.

The passivation layer may additionally be crosslinked. For this purpose, a crosslinking agent may be mixed with the preparation. However, the metal may first be treated with the preparation and the layer then be treated with a suitable crosslinking agent, for example sprayed with the solution of a crosslinking agent.

Suitable crosslinking agents are water-soluble or soluble at least in said aqueous solvent mixture. Examples of suitable crosslinking agents comprise in particular those which have at least 2 crosslinking groups selected from the group consisting of azirane, oxirane or thiirane groups. Further details on suitable crosslinking agents and the use thereof are disclosed in WO 05/042801, page 11, line 34 to page 14, line 39.

By means of the process according to the invention, a passivation layer or conversion layer is obtained, in particular on a metallic surface comprising Zn, Zn alloys, Al or Al alloys. In the course of the treatment of the surface, a part of the metal to be protected dissolves and is incorporated immediately thereafter again into an oxidic film on the metal surface. By using the copolymers X with a high content of acidic groups and a low degree of neutralization, superficial dissolution takes place particularly well, and excellent corrosion protection is obtained. The exact structure and composition of the passivation layer is unknown to us. However, said layer also comprises, in addition to the conventional amorphous oxides of aluminum or of zinc and, if appropriate, further metals, the reaction products of the polymer and, if appropriate, of the crosslinking agent and/or further components of the formulation. The composition of the passivation layer is generally inhomogeneous, but the components appear to have concentration gradients.

The thickness of the passivation layer is adjusted by the person skilled in the art according to the desired properties. As a rule, the thickness is from 0.01 to 3 µm, preferably from 0.1 to 2.5 µm and particularly preferably from 0.5 to 2 µm.

The thickness can be influenced, for example, by the type and amount of the components applied and the contact time. Furthermore, it can be influenced by process parameters, for example by removal of excess applied treatment solution by means of a doctor blade or roll.

The thickness of the layer is determined by differential weighing before and after the action of the composition used according to the invention on the metal surface, assuming that the layer has a specific density of 1 kg/l. Below, "layer thickness" is always understood as meaning a parameter determined in this manner, regardless of the actual specific density of the layer. These thin layers are sufficient for achieving outstanding corrosion protection. The dimensional stability of the passivated workpieces is ensured by such thin layers.

The present invention furthermore relates to a metallic surface which comprises the passivation layer according to the invention. The passivation layer is applied directly to the actual metal surface. In a preferred embodiment, said metal surface is a steel strip metal which comprises a coating of Zn or of a Zn alloy and on which a passivation layer according to the invention is applied. It may furthermore be an automotive bodywork which is covered by the passivation layer according to the invention. The metallic surface with the passivation layer can be overcoated in a manner known in principle with one or more color-imparting or effect-imparting paint coats. Typical paints, the composition thereof and typical such as coat sequences in the case of a plurality of paint coats are known in principle to the person skilled in the art. It is found that the passivation according to the invention improves the paint adhesion and produces undermigration protection.

The passivation according to the invention can be used at different processing stages. It can be carried out, for example, by a steel producer. Here, a steel strip can be galvanized in a continuous process and passivated immediately after the galvanization by treatment with the formulation used according to the invention. Passivation at this stage is frequently also referred to by the person skilled in the art as "aftertreatment".

This may only be a temporary passivation which serves for corrosion protection during storage and during transportation and/or in further process steps but is removed again before application of the permanent corrosion protection. The acidic copolymers can be removed again from the surface by cleaning with aqueous alkaline solutions.

However, it may also be a permanent corrosion protection treatment which remains on the strip or the finally shaped workpiece and is provided with additional paint coats. Passivation at this stage is also frequently referred to by the person skilled in the art as "pretreatment".

The addition of waxes in the method according to the invention for the passivation is advantageous in the further processing of the metallic materials, in particular in the further processing of metal sheets and/or strips which were passivated by means of the method according to the invention.

For the production of workpieces starting from metal sheets, strips or other metallic semifinished products, at least one cutting step and working step are as a rule required. Greater components can then be assembled from individual parts. During the working, the shape of the material is as a rule changed in contact with a tool. Said working may comprise, for example, forming under compressive conditions, such as rolling or embossing, forming under a combination of tensile and compressive conditions, such as drawing, deep drawing, plunging or compression, forming under tensile conditions, such as lengthening or widening, flexural forming, such as bending, roll-bending or canting, and forming under shearing conditions, such as twisting or displacing.

As a result of the addition of waxes, the friction of the surface of the metal with the surface of the tools used for working can advantageously be reduced. Consequently, gentler processing is achieved and advantageously impairment of or damage to the passivated surface is avoided.

The following examples are intended to illustrate the invention in more detail:

Materials Used

Copolymer X

Acid group-containing copolymer of 60% by weight of acrylic acid, 20% by weight of maleic acid and 20% by weight of vinylphosphonic acid. The amount of acid groups is 1.37 mol/100 g of polymer. The degree of neutralization of the acid groups is about 6 mol % (neutralized with triethanolamine), $M_w$ about 25 000 g/mol.

Waxes

Wax I is a montan ester wax having a melting point of about 78° C. Acid number of the wax 25-35 mg KOH/g, $M_n$ about 1000 g/mol. An aqueous, nonionic emulsion of the wax having a solids content of about 40% is used.

Wax II is a high-density polyethylene wax having a melting point of about 126-133° C. Acid number of the wax 17.5-19 mg KOH/g, $M_w$ about 12 000 g/mol. An aqueous emulsion having a solids content of about 35% is used.

Wax III is an oxidized polyethylene wax having a melting point of about 125° C. Acid number of the wax 20-24 mg KOH/g, $M_w$ about 11 000 g/mol. An aqueous emulsion having a solid content of about 30% is used.

Formulations Used:

Formulation 1:

Solution of the copolymer (about 25%) in water;

Optionally, the amounts of wax stated in Table 1 are also added.

Optionally, water was also added so that in each case a concentration of 20% of copolymer, based on all components of the formulation, resulted.

pH of the formulation <3

Formulation 2:

Solution of the copolymer (about 25%) in water;

4.53% by weight of $Mg_3(PO_4)_2$, based on copolymer X (=>1.26% by weight of $Mg^{2+}$, based on copolymer X)

3.39% by weight of $H_3PO_4$, based on copolymer X (=>total phosphate: 6.76% by weight, based on copolymer X)

Optionally, the amounts of wax stated in Table 1 were also added.

Optionally, water was also added so that in each case a concentration of 18% of copolymer, based on all components of the formulation, resulted.

pH of the formulation <3

The wax-containing formulations form, in some cases after a few days, without mechanical agitation, a 2-phase mixture which, however, can be homogenized again without great effort by simple shaking.

Steel Sheets, Cleaning

For the Examples and Comparative Examples, test sheets comprising hot-galvanized steel 1.0037 (Gardobond® HDG-OE) were used.

The sheets were immersed in an alkaline cleaning solution (Ridoline® C72, from Henkel) for 10-20 seconds, rinsed immediately with demineralized water and then dried with nitrogen.

Coating

The sheets were each immersed for 3 sec in the respective formulations, immediately rolled and dried for 12 sec at 160° C.

Layer Thickness

The thickness of the passivation layer was determined by differential weighing before and after the action of the composition used according to the invention on the metal surface and with the assumption that the layer has a specific density of 1 kg/l. Below, "layer thickness" is always understood as meaning a parameter determined in this manner, independently of the actual specific density of the layer.

Corrosion Tests

Salt Spray Test

The corrosion-inhibiting effect was determined by means of a salt spray test according to DIN 50021. This spray mist test is a corrosion test which is standardized in DIN 50021 and in which atomized sodium chloride solution is allowed to act on the sample. 1.5 ml/h, based on an area of 80 cm², of the solution are sprayed with the aid of moistened compressed air onto a inclined sample at 35° C. The solution used was a 5% strength NaCl solution. The coated samples are subjected to the test intact.

Damage occurs at weak points and is on the basis of the extensive occurrence of white rust in surface rust indices from R10 (no rust phenomena) to R0 (complete rust coverage, cf. Table below).

| Defect area % | Rating $R_\beta$ or $R_A$ |
|---|---|
| no defect | 10 |
| $0 < A \leq 0.25$ | 9 |
| $0.25 < A \leq 0.5$ | 8 |
| $0.5 < A \leq 1.0$ | 7 |
| $1.0 < A \leq 2.5$ | 6 |
| $2.5 < A \leq 5.0$ | 5 |

-continued

| Defect area % | Rating $R_\beta$ or $R_A$ |
|---|---|
| 2.5 < A ≤ 5.0 | 5 |
| 5.0 < A ≤ 10 | 4 |
| 10 < A ≤ 25 | 3 |
| 25 < A ≤ 50 | 2 |
| 50 < A ≤ 75 | 1 |
| 75 < A | 0 |

The greater the rust index the better.

Condensation-Cyclic Climate Test:

The condensation-cyclic climate test (DIN 50017) consists of one or more climate cycles with in each case two test segments. In the first segment, the test specimens are subjected for 8 hours to a temperature of 40° C. and a relative humidity of 100%; in the second segment, said test specimens are subjected to a temperature of 18-28° C. at relative humidity of less than 100% (ambient condition). The duration of the cycle is thus 24 hours. In total, 3 cycles were carried out.

Mechanical Tests:

Cupping (Erichsen)

The extensibility of a coating on a metal sheet during slow deformation of the metal sheet is determined by means of the Erichsen Test (DIN 53156). For this purpose, the coated metal sheet is deformed by slowly pressing in a ball (diameter: 20 mm) from the back of the metal sheet. The metal sheets were each deformed to an indentation depth of 6.5 mm and 9.5 mm, and the quality of the coating at the indentation point was then visually assessed.

The coatings were assessed by means of the following ratings:

0 coating cracked
1 coating superficially cracked
2 coating almost intact (very slight starting points of cracks detectable)
3 coating intact without cracks Surface Friction:

The surface friction was determined by sliding a movable slide having a mass of 1 kg on 3 contact points (7 mm, stainless steel ball) at a constant speed of about 0.1 m/s over the metal sheet (50 cm*10 cm). In each case the force for the horizontal movement of the mass resting on the metal sheet was determined by means of a spring balance. Measured values were stated as the mean value of 10 measurements. The forces are stated in mN.

All results are listed in Table 1.

TABLE 1

List of the formulations used and of the measured results

| | Example No. | | | | | | | | | | | | | | | |
|---|---|---|---|---|---|---|---|---|---|---|---|---|---|---|---|---|
| | C1 | C2 | 1 | 2 | 3 | 4 | 5 | 6 | 7 | 8 | 9 | 10 | 11 | 12 | 13 | 14 |
| Formulation used | 1 | 2 | 1 | 2 | 1 | 2 | 1 | 2 | 1 | 2 | 1 | 2 | 1 | 2 | 1 | 2 |
| Wax I [% by weight][1] | — | — | 0.5 | 0.56 | 5 | 5.6 | — | — | — | — | — | — | — | — | — | — |
| Wax II [% by weight][1] | — | — | — | — | — | — | 0.5 | 0.56 | 5 | 5.6 | — | — | — | — | — | — |
| Wax III [% by weight][1] | — | — | — | — | — | — | — | — | — | — | 0.5 | 0.56 | 5 | 5.6 | 25 | 27.8 |
| Layer thickness [μm] | <2 | <2 | <2 | <2 | <2 | <2 | <2 | <2 | <2 | <2 | <2 | <2 | <2 | <2 | <2 | <2 |
| Surface friction [in mN] | 7540 | 7370 | 3830 | 3650 | 1040 | 940 | 4500 | 3950 | 1560 | 1700 | 6890 | 5750 | 1300 | 1530 | 900 | 960 |
| Salt spray test, after 48 h | R7 | R10 | R7 | R8 | R7 | R9 | R6 | R7 | R8 | R8 | R6 | R9 | R8 | R9 | R3 | R4 |
| Cyclic climate test after 72 h | R10 | R10 | R10 | R10 | R10 | R10 | R10 | R10 | R10 | R10 | R10 | R10 | R10 | R10 | R5 | R5 |
| Erichsen cupping [6.5 mm] | 3 | 3 | 3 | 3 | 3 | 3 | 3 | 3 | 3 | 3 | 3 | 3 | 3 | 3 | 3 | 3 |
| Erichsen cupping [9.5 mm] | 0 | 1 | 2 | 1 | 2 | 1 | 0 | 1 | 3 | 3 | 2 | 0 | 3 | 3 | 3 | 3 |

Remarks:
[1] % by weight, based on copolymer X;
C = Comparative Example

The Examples and Comparative Examples show that the mechanical properties of the coating are substantially improved by the addition of waxes.

The surface friction decreases significantly on addition of only small amounts of waxes. As a result, the mechanical processing and machining of the metal sheets is facilitated. The larger the amount of wax, the lower the surface friction. However, the corrosion protection effect of the surface coating decreases again in the case of large amounts from about 25% by weight of wax.

With from 0.5 to 0.6% by weight of wax, based on the polymer, slight improvements compared with experiments without wax are achieved in the Erichsen test, and substantial improvements with from 5 to 6% by weight.

Polyethylene wax and oxidized polyethylene wax each give better results than montan ester wax.

We claim:

1. A process for the passivation of the surface of a strip metal by means of a continuous process by treatment of the surface with an acidic, chromium-free aqueous preparation comprising at least one water-soluble polymer X comprising acidic groups, wherein (1) the polymer has at least 0.9 mol of acid groups/100 g of the polymer and is a copolymer X1 comprising the following monomeric units based in each case on the amount of all monomers incorporated as polymerized units in the copolymer:
(A) from 40 to 90% by weight of (meth)acrylic acid;
(B) from 5 to 60% by weight of at least one further monoethylenically unsaturated monomer which differs from (A) and has one or more acidic groups and is selected from the group consisting of:
(B1) monoethylenically unsaturated dicarboxylic acids having 4 to 7 carbon atoms; and/or
(B2) monoethylenically unsaturated phosphoric and/or phosphonic acids; and
(C) optionally from 0 to 30% by weight of at least one further ethylenically unsaturated monomer differing from (A) and (B);
(2) the pH of the preparation is not more than 5;
(3) the amount of the polymer is from 15 to 25% by weight, based on the amount of all components of the preparation;
(4) the preparation furthermore comprises at least one wax having a melting point from 100° C. to 160° C. and wherein said wax comprises oligomeric or polymeric substances having a molecular weight $M_n$ greater than 400 g/mol, and having a proportion by weight of more than 60% by weight of structural elements selected from the group consisting of ($-CH_2-CH_2-$), ($-CH_2-CH<$), ($CH_2-CH(CH_3)-$), ($-CH_3$), ($-CR_2-CR_2-$), and ($-CR_2-CR(CR_3)-$), wherein R is H and/or F, and with the proviso that said structural elements are linked to one another so that they predominantly comprise units of at least 12 carbon atoms linked directly to one another;
(5) the amount of the wax is from 1 to 18% by weight, based on the total amount of all polymers X; and
(6) the application of the aqueous preparation is performed by means of coating rolls.

2. The process of claim 1, wherein B1 comprises at least one monomer selected from the group consisting of maleic acid, furmaric acid, and itaconic acid.

3. The process of claim 1, wherein B2 is at least one monomer selected from the group consisting of vinylphosphonic acid, vinyl phosphate, or allylphosphonic acid.

4. The process of claim 1, wherein the copolymer comprises at least one monomer (B1) and at least one monomer (B2).

5. The process of claim 4, wherein the amount of (A) is from 50 to 90% by weight, the amount of (B1) is from 5 to 45% by weight, the amount of (B2) is from 5 to 45% by weight, and the amount of (C) is from 0 to 20% by weight.

6. The process of claim 4, wherein the amount of (A) is from 50 to 80% by weight, the amount of (B1) is from 12 to 42% by weight, the amount of (B2) is from 8 to 38% by weight, and the amount of (C) is from 0 to 10% by weight.

7. The process of claim 1, wherein (B1) is maleic acid and (B2) is vinylphosphonic acid.

8. The process of claim 1, wherein said wax is at least one wax selected from the group consisting of polyethylene waxes, ethylene-(meth)acrylic acid waxes, and oxidized polyethylene waxes.

9. The process of claim 1, wherein the formulation further comprises at least one metal ion selected from the group consisting of $Zn^{2+}$, $Ca^{2+}$, $Mg^{2+}$, and $Al^{3+}$.

10. The process of claim 1, wherein said metallic surface comprises Zn, Al, Mg, Sn, Fe, Ni, or alloys thereof.

11. The process of claim 1, wherein said strip metal is electrogalvanized or hot-galvanized steel.

12. The process of claim 1, wherein not more than 40% of the acid groups present in the polymer are neutralized.

13. The process of claim 1, wherein said wax is incorporated to the formulation as micronized wax and/or wax dispersion.

* * * * *